United States Patent [19]

Hoyt

[11] 3,995,891
[45] Dec. 7, 1976

[54] DRIVER'S OVERHEAD GUARD

[75] Inventor: Deryl R. Hoyt, Battle Creek, Mich.

[73] Assignee: Clark Equipment Company, Buchanan, Mich.

[22] Filed: Dec. 1, 1975

[21] Appl. No.: 636,501

[52] U.S. Cl. .............................. 296/102; 29/160; 403/263
[51] Int. Cl.² ....................................... B60R 21/00
[58] Field of Search ....... 296/102; 280/756, 106 R, 280/106 T; 29/160; 403/382, 263, 186; 52/626

[56] References Cited

UNITED STATES PATENTS

| | | | |
|---|---|---|---|
| 2,274,125 | 2/1942 | Carney | 29/160 |
| 2,350,875 | 6/1944 | Carney | 29/160 |
| 2,911,232 | 11/1959 | Hastings | 280/756 |
| 3,224,081 | 12/1965 | Richter | 29/160 |
| 3,289,871 | 12/1966 | Tourneau | 280/756 |
| 3,472,550 | 10/1969 | Marco | 296/102 |
| 3,502,292 | 3/1970 | Yoder | 403/263 |
| 3,584,897 | 6/1971 | Frantz | 296/102 |
| 3,679,256 | 7/1972 | Orns | 296/102 |
| 3,933,371 | 1/1976 | Graham | 296/102 |

*Primary Examiner*—Robert R. Song
*Attorney, Agent, or Firm*—John C. Wiessler

[57] ABSTRACT

An inverted generally U-shaped overhead protective guard for industrial vehicles in which the overhead guard canopy or bridge includes a pair of parallel spaced hollow multi-sided members. Each hollow member has a plurality of longitudinally spaced notches through one side in alignable and facing relation with corresponding notches in one side of the other hollow member so that a guard bar may be fitted in each facing pair of notches. Side rails connect the respective ends of the hollow members. The bridge structure is supported from the vehicle by front and rear pairs of legs which together provide an overhead guard which extends over the operator's station.

15 Claims, 6 Drawing Figures

DRIVER'S OVERHEAD GUARD

BACKGROUND OF THE INVENTION

The field of art to which this invention relates includes overhead safety guards for industrial vehicles.

It is standard practice to equip industrial lift trucks and other industrial vehicles with overhead guards to protect the operator in case a load accidentally falls from a point above. The guard, of course, must extend over the operator's compartment at a height sufficient to provide adequate head clearance for the operator, while at the same time being of such a low overall height as to provide access to relatively low overhead areas, such as operation in and out of freight cars, and the like. Heretofore the overhead grille construction of inverted U-shaped four-legged guards for lift trucks has been of one of a few basic designs, viz., (1) a criss-cross design of bars and rods in which the bars ordinarily run longitudinally of the guard and are butt welded at the front and rear rails thereof with a plurality of transverse rods extending through or welded to the bars and/or to the side rails of the guard, such as is shown in the canopy design of U.S. No. 3,289,871; or (2) a similar bar and rod grille design as referred to in item (1), but also having a curved metal plate to extend the grille to the rear to provide adequate operator protection in trucks of certain designs, such as is shown in U.S. Pat. No. 3,679,256; or (3) relatively large transversely extending spaced bars which are butt welded at the ends to the side rails of the bridge structure, such as shown in U.S. Pat. No. 3,472,550; or (4) a reinforced perforated metal plate which covers the area between the rails of the bridge and which is ordinarily welded thereto, such as shown in Patent 2,911,232. Variations of these four design types have appeared from time to time, but together they tend to summarize the background prior art.

SUMMARY

This invention provides improvements in driver's overhead guards for industrial vehicles wherein spaced, parallel longitudinally extending bars form with a four-sided support an overhead protective bridge structure, the bars being preferably press fitted in transversely spaced notches formed in front and rear hollow multi-sided bridge members. The combination comprising by bridge structure provides a number of advantages over prior overhead guard structures including high rigidity and resistance to torsional force combined with reduced weight, improved visibility through the bridge structure, improved appearance and faster assembly time partly as a result of minimizing the number of weldments, lower cost, a reduction in noise in the operator's compartment in relation to certain prior bridge constructions and more readily controlled quality in part resulting from improvements in the method of manufacture.

It is a primary object of my invention to provide a much improved guard bridge structure.

DESCRIPTION OF THE PREFERRED EMBODIMENT

Figure 1:
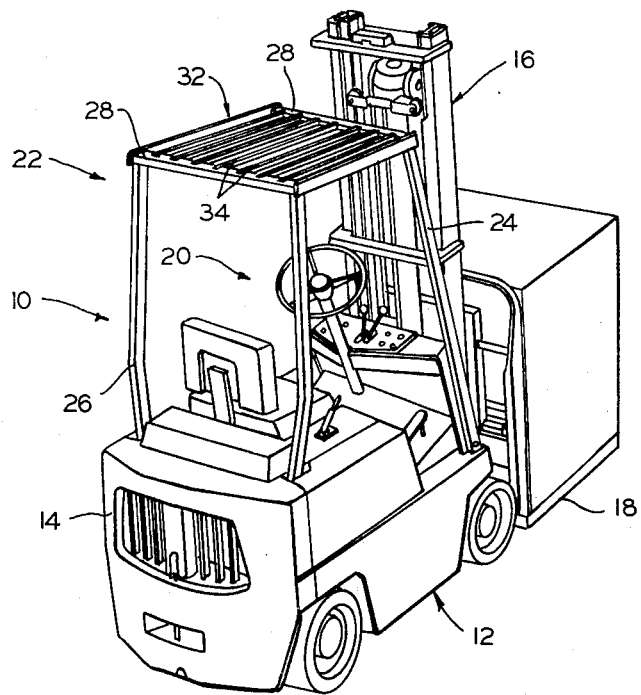
FIG. 1 is a right rear quarter perspective view of a lift truck which embodies my invention taken from an elevated position.

Referring now to the drawing, an industrial lift truck is indicated generally at numeral 10 which includes a body and frame 12 mounted from a front drive axle and wheel assembly and a rear steer axle and wheel assembly, a counterweight 14, a tiltable telescopic mast structure and fork carriage 16 and 18 mounted from the front end of the truck, an operator's station 20, and an inverted generally U-shaped overhead guard 22 which extends over the operator's station and is connected to the front corners of the body, as shown, by a pair of front legs 24 and to the rear body portion ahead of the counterweight by a pair of rear legs 26, both pairs of legs being secured, as by welding, at the upper ends thereof to front and rear transverse hollow multi-sided structural members 28, 28 of the bridge structure 32 of the guard.

As shown, each of the hollow structural members 28 is rectangular in cross section, although the sectional configuration may be varied so long as top and bottom flat and parallel sides are provided with openings in a flat front side for the reception of a plurality of parallel guard bars 34 such that the strength and rigidity of the guard meets industry code safety requirements while effecting the functional and structural advantages of my overhead guard bridge as noted above. Although square or rectangular hollow tube is preferred for reasons of cost, availability, rigidity and convenience in assembly, other configurations of members 28 may comprise, for example, a nonrectangular parallelogram or a member of trapezoidal cross section wherein the parallel sides are top and bottom sides of the member.

Figure 6:
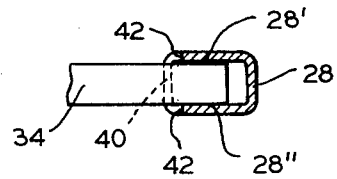
FIG. 6 is an enlarged sectional view taken along line 6—6 of FIG. 4 with the addition of a guard bar shown inserted in the opening thereof.
Figure 3:
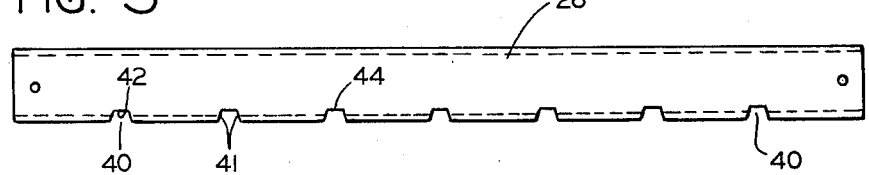
FIG. 3 is an enlarged plan view of one of the transverse hollow multi-sided end members of the bridge structure.
Figure 4:
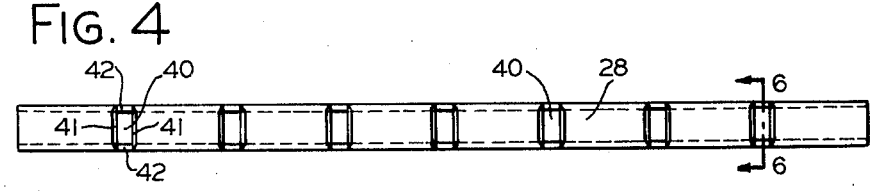
FIG. 4 is a front view of the member shown in FIG. 3.

Members 28 provide confronting sides 36 and 38 at the front and rear, respectively, of the bridge structure, in each of which sides is formed a plurality of equally spaced notches 40 which preferably are angled inwardly through the wall at the sides of each opening as shown at 41 to provide the notch formation as best shown in FIGS. 3, 4 and 6. The openings 40 are preferably formed by a broaching machine or by a gang mill which is adapted to form a plurality of such openings in a single pass. Each opening extends a small distance into the top and bottom sides of member 28 as shown at 42.

Figure 2:
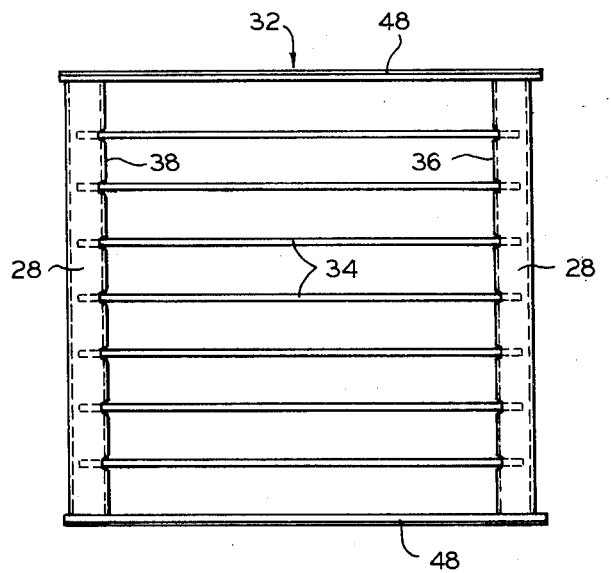
FIG. 2 is an enlarged plan view of the bridge structure of the overhead guard shown mounted on the lift truck in FIG. 1.
Figure 5:
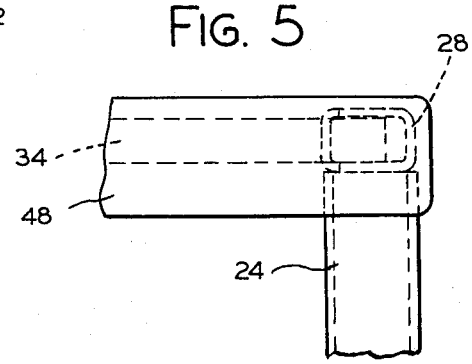
FIG. 5 is an enlarged partial view of the front right corner section of the guard.

In assembling the bridge structure a fixture may be utilized in a suitable hydraulic press, for example, in which the guard bars 34 are located in predetermined spaced and parallel relation, such as in FIG. 2, members 28 being actuated simultaneously in the press towards the respective ends of the guard bars in axial alignment with notches 40 so that bars 34 are readily guided into the notches between angled sides 41 and top and bottom chamfers 42, thence being firmly pressed through each inner smaller opening 44. The press fit is not essential to the practice of my invention, although it is preferred in order to avoid the noise of rattling guard bars which would result if a press fit or other connection were not effected through angled sides 41.

The guard bars are therefore preferably pressed a substantial distance into hollow members 28 as shown in FIG. 2 so as to provide the known benefits in loading of a restrained beam type of anchor which theoretically doubles the resistance of bars 34 to permanent deflection as compared with a non-restrained end supported beam. That is, the upper and lower surfaces of each end portion of each bar 34 are in contact with corresponding inside surfaces 28' and 28'' of each tube 28 when the guard bars are placed under a sufficient load so that resistance couples or a restrained beam effect is produced. To insure this effect no more than a small clearance should exist when the bridge is assembled between the adjacent top and bottom surfaces of members 28 and the corresponding end portions of the bars 34. It will be appreciated that the same effect may be achieved in the use of members 28 which provide parallel top and bottom sides, such as in a trapezoid or non-right angle parallelogram section, whereby the notches 40 would appear in non-parallel confronting sides of the members 28 with a restrained beam effect as above described as between the parallel sides and the end portions of the guard bars. The desired effect would not be achieved, for example, if hollow tubular end members 28 were utilized because then only essentially line contact between the ends of the guard bars and the tubular members would be effected at each notch. The resistance to permanent deflection of bars 34 in the structure as described above is approximately double the resistance in a structure in which bars 34 are merely welded at their ends to the confronting sides of front and rear solid end members, for example, the latter structure being that which has been heretofore commonly used in such safety guards.

A predetermined overall length of the bridge structure is established in assembling the bars 34 in members 28, following which a pair of solid side members 48 are secured, as by welding, between the respective ends of members 28, the bridge structure 32 being then ready for attachment to the pairs of legs 24 and 26, and the guard 22 being then ready for connection to the lift truck 22.

A surprisingly large number of functional and structural advantages inhere in the above described overhead guard bridge structure. In industrial truck overhead guard design certain of the important factors which must be considered relate to the required length of the bridge for any given truck design while providing sufficient structural rigidity to remain within the maximum permanent deflection permitted in the weight drop test established by American National Standard B56.1, while at the same time minimizing the thickness of the bridge structure in order to provide both adequate head clearance for the operator and the lowest possible overall machine height for overhead clearance. Furthermore, the width of the structural members in the bridge has been restricted by the need to provide visibility through the grille structure.

Prior art structures, as exemplified in the patents noted in the statement of Background above, necessarily compromise a number of the advantages which inhere in my invention. For example, U.S. Pat. No. 3,679,256 includes a curved metal plate 60 located at the rear of the bridge structure for the purpose of shortening the length of the longitudinal bars so that the bars in combination with the transverse rods produce a structure which does not exceed specified maximum deflection limits. In addition to reduced visibility through the grille structure of a guard of such design encountered as when a load is being picked up or deposited at an elevation which requires the operator to view the engagement or deposit of the load through the grille structure, it has been found that the use of such rearwardly located metal plates, being in close proximity to the operator's ears, serves to transmit and reflect vehicle noise and contributes to increase the noise level at the operator's ear level. The recent adoption in certain industrial operations limiting noise levels to which workers are subjected makes it desirable to minimize such a design related problem.

The length of the bridge structure required in the truck design of U.S. Pat. No. 3,289,871 is not such as to require a rear protective metal plate as noted above, but the all welded construction does require an intersecting grille network, as shown, in order to provide an acceptable guard within the overall height, length and deflection limits. While such guards are effective and do meet the various design requirements, operator visibility through the grille is reduced, quality control and manufacture is relatively difficult in respect of consistent spacing, placement and weldments of each bar and rod in the grille, and the cost and time in manufacturing such guards is substantially greater than in my present design. It should also be noted that the end welded construction inherently produces spatter and clean-up problems, as well as problems which may involve heat and weld distortion of the bridge structure during assembly.

U.S. Pat. No. 2,911,232, which utilizes a perforated metal plate construction reinforced by longitudinal bars, reduces operator visibility through the perforated plate, and is relatively costly.

In respect of the transverse bar structure of U.S. Pat. No. 3,472,550 the guard bars are butt welded to the side rails because the distance between the side rails is sufficiently short to permit the use of such a construction which is within the maximum deflection, head clearance, and overall height limits. It will be appreciated that such relatively large transverse bars in combination with the average eye level of an operator substantially restricts visibility through the bars at the angle required to see the load through the bridge when it is elevated on the mast. Other problems inherent in such construction as mentioned previously in relation to multiple weldments, quality control, and the like, are also present.

Considering now the particulars of my invention in relation to the stated structural and functional advantages, it will be noted first that longitudinal bars 34 alone may be used to provide operator protection within standard limits specified across a substantially longer span than heretofore as a result of the restrained beam construction. Also, I have found that my design substantially increases torsional resistance to eccentric loading, such as by forces imposed from above in a corner area of the bridge structure, the torsional load acting through the rectangular tube in such a manner as to distribute the loading to other bars 34 to a much greater extent than in prior butt welded constructions. The longitudinal grille bar structure also provides substantially improved operator visibility than previously since the operator is able to look upwardly and forwardly through the otherwise unobstructed longitudinal openings provided between the bars. The structure is capable of being manufactured at lower cost than heretofore while providing consistently better quality control results in certain respects, such as the regular spacing in parallel relation of bars 34 resulting from machining of openings 40 and hydraulic press operations, the elimination of numerous weldments with the consequent reduction of other undesirable features discussed before, improved appearance, and a method of assembly which is substantially faster than previously. Furthermore, there is no acoustical problem of significance associated with the invention, the weight of the bridge structure has been substantially reduced in the use of hollow tube and unidirectional grille bars of relatively small depth and thickness, and guard bar rattle is eliminated by means of the press fit between the tubes and bars.

I prefer to use cold rolled grille bars because closer tolerances and higher yield strength results, although hot rolled bars or high strength steel may be used if desired. Also, while the press fit between the grille bars and rectangular tubes is preferred as discussed previously, it is not necessary in order to achieve most of the advantages of this invention, except that a non-press fit would result in undesirable noise from rattling of the grille bars in the notches and possible resonance thereof in the tubes 28. Also, of course, the grille bars could be welded at the notches to avoid such a rattle effect, although such multiple weldments has other disadvantages and is not preferred.

It will be apparent to those skilled in the art that various changes in the structure and relative arrangement of parts may be made without necessarily departing from the scope of my invention. Accordingly, I intend to cover by the appended claims all such modifications which fall within the scope of my invention.

I claim:
1. In an industrial vehicle having an overhead guard of generally inverted U-shaped construction which extends over an operator's compartment, a bridge structure connecting the legs of said guard comprising a pair of spaced multi-sided hollow structural members having inner sides confronting, a plurality of openings in one inner side spaced longitudinally thereof and substantially aligned with similar openings in the other inner side, a guard bar extending through each confronting pair of openings and into the interiors of both hollow structural members in such a manner as to provide a plurality of restrained beams when said beams deflect under load.

2. An overhead guard as claimed in claim 1 wherein each of said hollow structural members provides substantially parallel top and bottom sides which are adapted to provide a resistance force couple at the end portion of each guard bar inside of the hollow member.

3. An overhead guard as claimed in claim 1 wherein the hollow structural members are longitudinally spaced and transversely extending and the guard bars are transversely spaced and longitudinally extending, whereby operator visibility upwardly and forwardly through the guard bars is improved.

4. An overhead guard as claimed in claim 3 wherein the sole basic bridge structure comprises said hollow structural members and guard bars.

5. An overhead guard as claimed in claim 1 wherein said openings are formed so as to provide with said guard bars a press fit whereby to prevent guard bar rattle during vehicle travel.

6. An overhead guard as claimed in claim 4 wherein the bridge structure is of such a depth as to provide adequate operator head clearance and sufficiently low overall guard height.

7. An overhead guard as claimed in claim 1 wherein said bridge structure is assembled by locating the guard bars in predetermined spaced positions in a press and actuating simultaneously the openings of said hollow structural members into a pressed relation with the end portions of the guard bars.

8. An overhead guard as claimed in claim 1 wherein said hollow structural members tend to maximize torsional resistance to eccentric loading on the bridge structure such as at a corner portion thereof.

9. An overhead guard as claimed in claim 1 wherein said guard bars are cold rolled to provide relatively high yield strength and in combination with said hollow structural members provide a relatively low weight bridge structure.

10. An overhead guard as claimed in claim 1 wherein said openings are machined in predetermined locations in the structural members to provide consistent quality control of the configuration of the bridge structure and of the spacing and location of the guard bars.

11. An overhead guard as claimed in claim 1 wherein the hollow structural members and guard bars are assembled without weldments.

12. An overhead guard as claimed in claim 10 wherein said openings are formed in multiple groups by a broaching machine.

13. An overhead guard as claimed in claim 10 wherein said openings are formed in multiple groups by a gang mill.

14. An overhead guard as claimed in claim 10 wherein said openings are formed to provide inwardly converging openings in the wall of the hollow structural member.

15. An overhead guard as claimed in claim 9 wherein said cold rolled bars are held to close tolerances in relation to said openings, said openings being machined to provide high quality controls in relation to the fit and location of the bars.

* * * * *